United States Patent [19]

Lautenschlager

[11] Patent Number: 5,490,212
[45] Date of Patent: Feb. 6, 1996

[54] CALL-ROUTING METHOD FOR A VIRTUAL PRIVATE NETWORK AS WELL AS SERVICE COMPUTER AND EXCHANGE THEREFOR

[75] Inventor: Wolfgang Lautenschlager, Weissach-Flacht, Germany

[73] Assignee: Alcatel SEL Aktiengesellschaft, Stuttgart, Germany

[21] Appl. No.: 289,782

[22] Filed: Aug. 12, 1994

[30] Foreign Application Priority Data

Aug. 30, 1993 [DE] Germany ............... 43 29 172.4

[51] Int. Cl.⁶ ............................................. H04M 3/42
[52] U.S. Cl. ..................... 379/225; 379/221; 379/201; 379/207; 379/229
[58] Field of Search ......................... 379/201, 207, 379/221, 132, 196, 211, 225, 113, 111, 115, 120, 246, 229, 114

[56] References Cited

U.S. PATENT DOCUMENTS

| | | | |
|---|---|---|---|
| 4,348,554 | 9/1982 | Asmuth | 379/221 |
| 4,756,019 | 7/1988 | Szybicki | 379/221 |
| 4,882,699 | 11/1989 | Evensen | 379/221 |
| 5,185,785 | 2/1993 | Funk et al. | 379/111 |
| 5,187,710 | 2/1993 | Chau et al. | 379/114 |
| 5,226,075 | 7/1993 | Funk et al. | 379/243 |
| 5,345,502 | 9/1994 | Rothenhöfer | 379/211 |
| 5,357,564 | 10/1994 | Gupta et al. | 379/196 |
| 5,361,297 | 11/1994 | Ortiz et al. | 379/132 |

FOREIGN PATENT DOCUMENTS

| | | | |
|---|---|---|---|
| 0452591 | 10/1991 | European Pat. Off. | H04M 3/42 |
| 3709750 | 10/1988 | Germany | H04M 15/34 |
| 3904403 | 8/1989 | Germany | H04L 12/46 |
| 4119672 | 12/1992 | Germany | H04Q 7/04 |
| 4225240 | 1/1993 | Germany | H04M 11/00 |

OTHER PUBLICATIONS

Mazur, Elizabeth M, et al: New voice and data features for Centrex. In: Record, May 1985—S.4–9.
Bochmann, Gregor von: Mondain–Monval, Pierre: Design Principles for Communication Gateways. In: IEEE Journal on selected areas in communications, Jan. 1990, vol. 8, No. 1, S.12–21.

*Primary Examiner*—Jeffery Hofsass
*Assistant Examiner*—Scott Wolinsky
*Attorney, Agent, or Firm*—Ware, Fressola, Van Der Sluys & Adolphson

[57] ABSTRACT

A call-routing method for a virtual private network consisting of two or more private communication units which are interconnected via switched connections of a public network as required, wherein to switch the switched connections, a service is dialled which then initiates further switching based on a private numbering plan, characterized in that to establish a connection to a subscriber of the private network, a subscriber of the public network dials the same service which then initiates further switching to one of the private communication units, that the service assigns tariffing attributes to each call initiated by it, and that the service assigns to a call between the private communication units other tariffing attributes than to the other calls. It is also directed to a service computer that supports switching calls both within and outside a private network, with different tariffing attributes assigned to the different type of calls. The service computer switches both calls between private branch exchanges of a private network and calls from outside with the aid of a private numbering plan, the latter being initiated with a different tariff. It is also directed to an exchange having at least one such service computer.

10 Claims, 2 Drawing Sheets

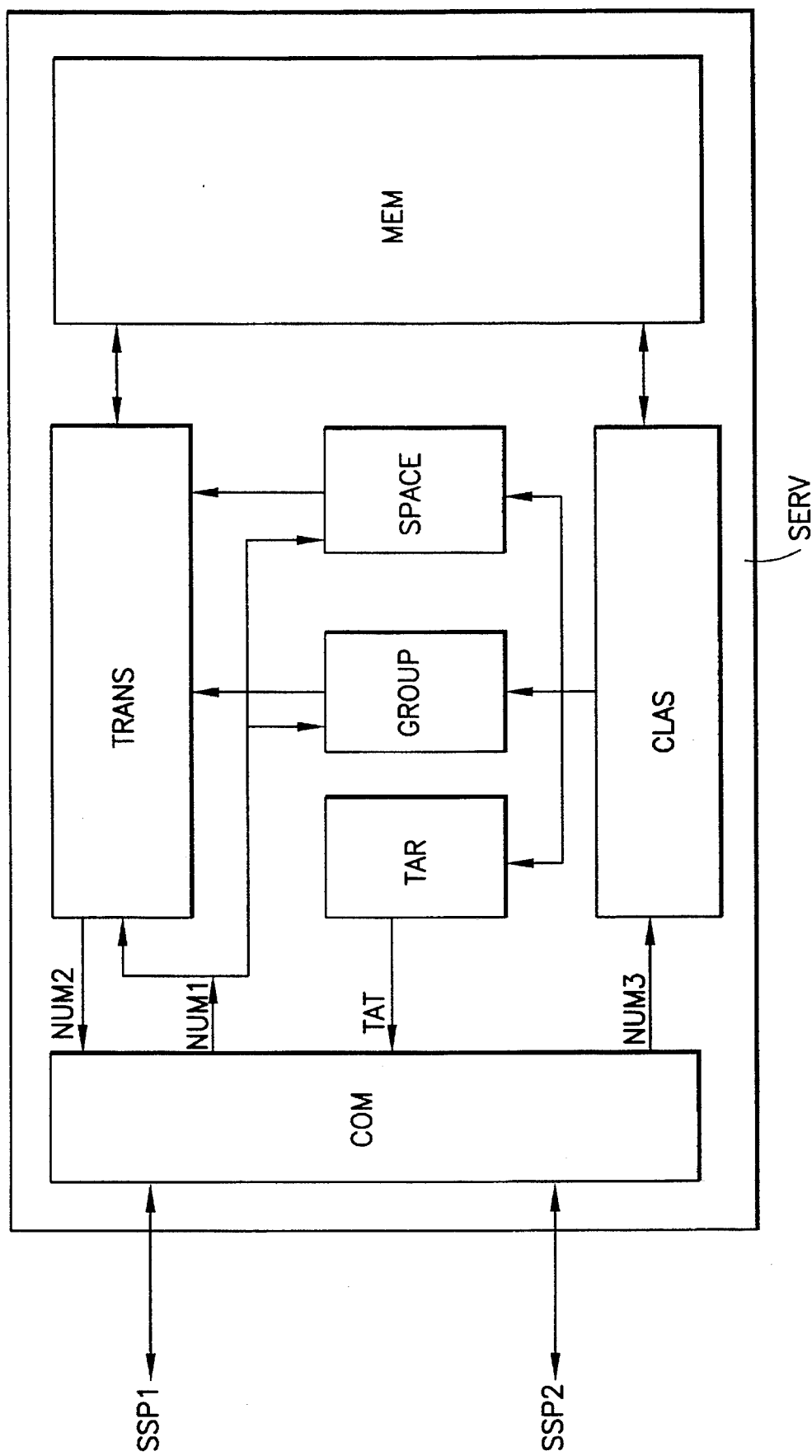

CALL-ROUTING METHOD FOR A VIRTUAL PRIVATE NETWORK AS WELL AS SERVICE COMPUTER AND EXCHANGE THEREFOR

TECHNICAL FIELD

The invention concerns a method for routing calls of a virtual private network consisting of two or more private communication units which are interconnected via switched connections of a public network as required, wherein to switch the switched connections, a service is dialled which then initiates further switching based on a private numbering plan. It is also directed to a service computer for connection to a network, comprising an interface for communication with at least one switching facility, a memory device designed to store data on a private numbering plan which assigns public telephone numbers to private telephone numbers, a translator for translating private telephone numbers into public telephone numbers, and a classification device for checking the association of a telephone number with the public telephone numbers stored in the memory device. It is further directed to an exchange comprising at least one service computer which is provided with a memory device designed to store data on a private numbering plan which assigns pubic telephone numbers to private telephone numbers, a translator for translating private telephone numbers into public telephone numbers, and a classification device for checking the association of a telephone number with the public telephone numbers stored in the memory device.

BACKGROUND OF THE INVENTION

Over time, two types of networks were developed in most countries. One is a public telecommunications network (e.g. a telephone network, ISDN-network) and the other a considerable number of private and special networks. In the following, the private network concept is used for this type of telecommunications network.

In most cases, a private network consists of a private branch exchange, to which several telephone sets are connected, and which has available a connection to the public network. Such a network is e.g. often found in companies or authorities.

If a company has several different locations, each of these locations requires its own private branch exchange. These private branch exchanges are often interconnected by leased dedicated public lines. Calls within the company require dialing the private branch exchange of the calling partner through these dedicated public lines.

SUMMARY OF THE INVENTION

The invention starts with a different solution for the problem of an intercity or even an interregional network, which is e.g. described in chapter "5.3.2 Virtual Private Networks" in the book "New Services in the Intelligent Telephone Network" by Wilhelm Krasch, published by RV. Decker's Publishers G. Schenk.

In this solution, the different private branch exchanges of a company are not interconnected by leased dedicated lines, but by switched connections. These switched connections are only established when needed, and are supported by a public network service, the Virtual Private Network (VPN) service. Each terminal of the private network is allocated a call number in accordance with a private numbering plan. If a call is made from a first private branch exchange area to a second private branch exchange area, the first private branch exchange dials the service and gives it the number of the private numbering plan for the desired subscriber. The service determines the call number of the corresponding private branch exchange, adds the call number of the private branch exchange to the private number and makes the call. However, before the service is rendered, it checks whether the call actually originates from a branch exchange of the private telephone network. The service is only performed if this is so. In addition to private branch exchanges, it is also possible for individual terminals to use this service.

In this way, the private network is formed of several private branch exchanges or individual terminals, which communicate with each other when necessary via switched connections of the public network, while the VPN service helps to complete the calls via the public network. This then becomes a virtual private network, since the switched connections of the public network are not components of the private network.

To the subscribers of such a virtual private intercity network, it seems that they are interconnected by a single private branch exchange. The entire virtual private intercity network consisting of several partial networks, has the effect of a single network. But this desired effect results only for the subscribers of the private network. When calling from outside of the private network, it is necessary to first dial the correct private branch exchange in the area of the desired subscriber, and then the desired subscriber's number.

The invention has therefore the task of making a virtual private network also act as a single network for outside callers.

This task is fulfilled by a call-routing method, wherein to establish a connection to a subscriber of the private network, a subscriber of the public network dials the same service which then initiates further switching to one of the private communication units, that the service assigns tariffing attributes to each call initiated by it, and that the service assigns to a call between the private communication units other tariffing attributes than to the other calls. The task is also fulfilled by a service computer that includes a tariffing device for generating tariffing attributes, and that the classification device is designed to send to the tariffing device data on the association of a telephone number with the public telephone numbers stored in the memory device. A further task is fulfilled by an exchange having at least one server wherein the server includes a tariffing device for generating tariffing attributes, and that the classification device is designed to send to the tariffing device data on the association of a telephone number with the public telephone numbers stored in the memory device.

The invention is based on the knowledge that the above described VPN service already has all the information to allocate to a number from the private numbering plan, the corresponding number of the private branch exchange or of the single device from the public network numbering plan.

It is therefore the basic idea of the invention that the very same service connects calls from inside and also from outside of the private network, and allocates different tariff rate attributes to the connection. The different tariff rates are necessary, since otherwise the fees for outside telephone calls would be charged to the operator of the virtual private network. Advantageous configurations of the invention can be found in the subclaims.

The invention has the advantage that possibilities exist for reaching all company locations with a single country-wide company telephone number. Thus, an outside caller only needs this company telephone number and the desired subscriber's telephone number from the private numbering plan. This results in the advantage that the private numbering plan applies to calls from inside as well as from outside of the virtual private network. In this way a subscriber e.g. can keep his telephone number when moving to another private branch exchange area of the virtual private network.

BRIEF DESCRIPTION OF THE DRAWINGS

The invention will be explained in more detail in the following by a configuration example with the aid of the attached drawings.

FIG. 2 is a block circuit diagram of a service computer according to the invention of FIG. 1.

BEST MODE FOR CARRYING OUT THE INVENTION

Figure 1:
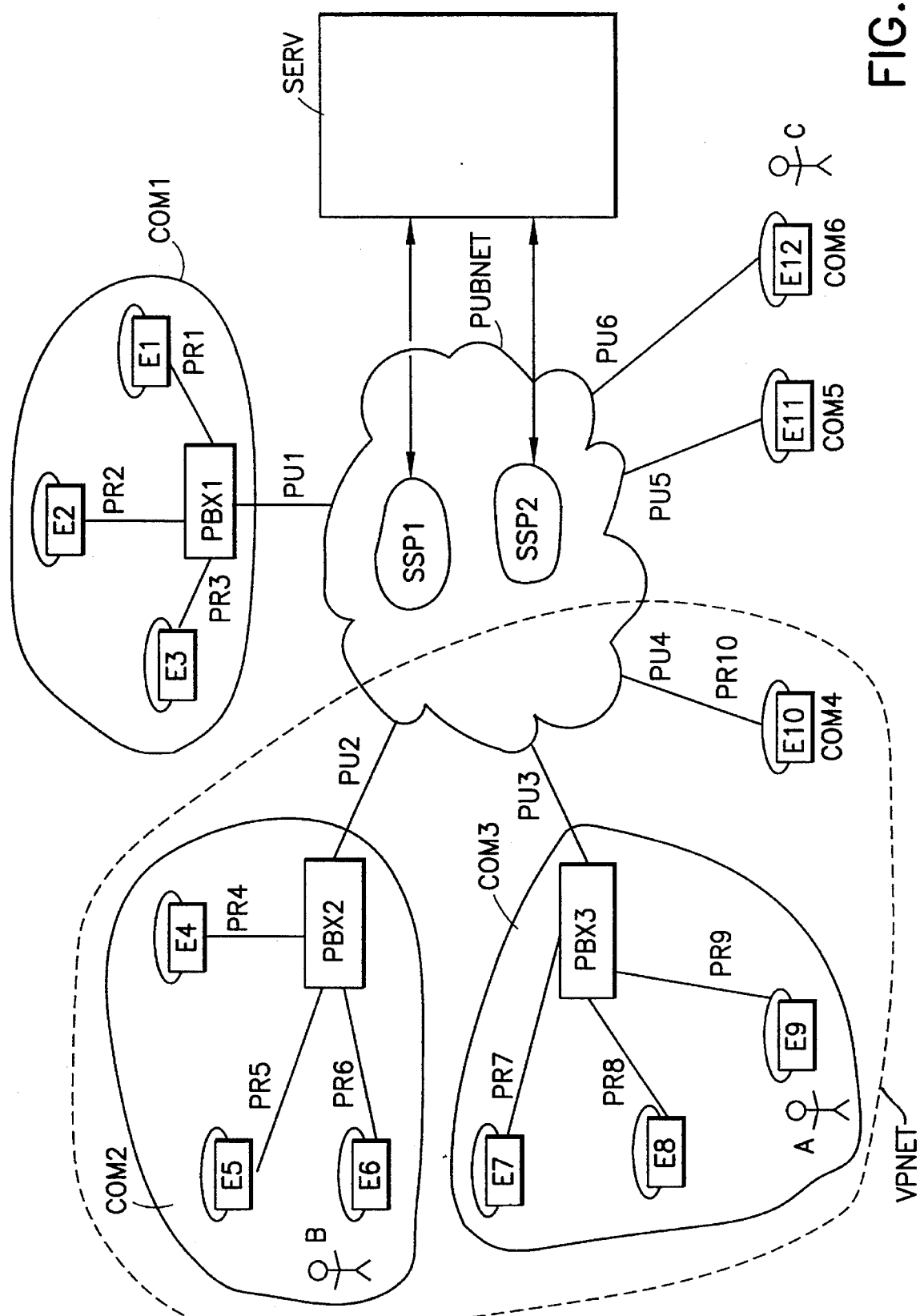
FIG. 1 is a symbolic representation of a communication arrangement with a service computer according to the invention.

The use of the invention method in a communication arrangement consisting of a virtual private network and a public network will be made clear below.

FIG. 1 depicts 6 communication units COM1 to COM6, a public network PUBNET and a service computer SERV.

The communication units COM1 to COM6 and the service computer SERV are connected to the public network PUBNET. The public network PUBNET is able to establish connections between the communication units COM1 to COM6.

Communication units COM2, COM3 and COM4 and the connections of the public network form a virtual private network VPNET. In this connection virtual means that the communication units COM2 to COM4 can communicate with each other when necessary via switched connections of the public network PUBNET, making it not possible to permanently allocate these connection paths to the virtual private network VPNET.

Communication unit COM1 is formed of a private branch exchange, consisting of a private branch exchange PBX1 and three terminals E1 to E3 connected thereto. Communication units COM2 and COM3 in turn also consist of private branch exchanges formed by a private branch exchange PBX2 or PBX3 and three terminals E4 to E6 or E7 to E9. Each one of the communication units COM4 to COM6 is formed by a terminal E10, E11, E12.

Each of the terminals E1 to E12 is formed by a terminal for a telecommunications network, such as a telephone, fax or a correspondingly built computer.

A different number of communication units or another arrangement of the communication units is also possible.

The communication arrangement in FIG. 1 has two different numbering plans. A public numbering plan allocates a public telephone number to each connection of the public network. Thus, numbers PU1 to PU6 are allocated to communication units COM1 to COM6. A private numbering plan allocates a private telephone number to each terminal of the private branch exchange. Thus, private telephone numbers PR4 to PR10 are allocated to terminals E4 to E10.

The public network PUBNET is configured like a usual telecommunications network. It therefore also contains several exchanges. Two of these exchanges SSP1 and SSP2 have special configurations. When a certain "elimination" number is called, exchanges SSP1 and SSP2 transmit inquiries to the service computer SERV. In the following, this elimination number will be called a service identification. In response they receive information concerning further treatment of the call.

It is possible to configure a different number of exchanges like exchanges SSP1 and SSP2, and connect them to service computer SERV. However, at least one such exchange is required.

From exchanges SSP1 and SSP2, service computer SERV receives data regarding a private telephone number, which is the target of a call, and data about the origin of the call. With these data, service computer SERV makes the further connection to a public telephone number and establishes the tariff rate for the call.

A subscriber B, A or C is located at each of the terminals E6, E9 and E12. The following takes place within the virtual private network VPNET. If subscriber A wants to reach subscriber B, subscriber A dials the private telephone number PR6 of subscriber B. The private branch exchange PBX3 knows that telephone number PR6 is not in its area and selects a telephone number from the public network, which is composed of the service identification and the private telephone number PR6. Exchange SSP1 or SSP2 recognizes the service identification and activates the service computer SERV. The latter determines the public telephone number PU2, with which terminal E6 can be reached with private telephone number PR6, and further connects the call to public telephone number PU2. In addition, the service computer SERV also establishes the tariff rate for the call. The private branch exchange PBX2 receives the call in its local loop and routes it to terminal E6 because of the private telephone number PR6.

If subscriber C, who is not a member of the virtual private network VPNET, wishes to reach subscriber B, he dials the service identification as a preselection code of the private network VPNET, and then the private telephone number PR6 of subscriber B. The call is again recognized by one of the exchanges SSP1 and SSP2, and service computer SERV makes the connection to telephone number PU2.

The exact functional sequence in service computer SERV, and between the service computer SERV and the two exchanges SSP1 and SSP2, will now be explained by means of FIG. 2.

FIG. 2 depicts service computer SERV. The service computer SERV contains a communication device COM, a classification device CLAS, a storage device MEM, a translation device TRANS, a tariff rate device TAR, a grouping device GROUP and an addressing device SPACE.

The communication device COM exchanges data with exchanges SSP1 and SSP2, and receives tariff data from tariff rate device TAR. The classification device CLAS receives data regarding a telephone number NUM3 from communication device COM, reads data from storage device MEM and sends data to tariff rate device TAR, to the grouping device GROUP and to the addressing device SPACE. Translation device TRANS receives data regarding a telephone number NUM1 from communication device COM, and in turn provides it with data about a telephone number NUM2. In addition, it reads data from the storage device MEM and receives data from the grouping device GROUP and the addressing device SPACE. Grouping device GROUP and addressing device SPACE receive data regarding telephone number NUM1 from communication device COM.

Communication device COM serves to communicate with exchanges SSP1 and SSP2. If one of these two exchanges SSP1 and SSP2 recognizes the service identification in front of a telephone number, it sends a request to service computer SERV. This request contains data about a called private telephone number NUM1 and about a public telephone number NUM3, which belongs to the communication unit from where the call originates. Communication device COM routes the public telephone number NUM3 to classification device CLAS, and the private telephone number NUM1 to translation device TRANS, to grouping device GROUP and addressing device SPACE. In turn, communication device COM receives data regarding a public telephone number NUM2 from translation device TRANS, or a message that no such number is available, and data about the tariff rate attributes TAT from the tariff rate device TAR.

The data regarding telephone number NUM2, or the message that such a telephone number is not available, and the tariff rate attributes TAT, are routed to exchange SSP1 or SSP2, depending on which of these two originated the request. These data cause the respective exchange SSP1 or SSP2 to connect the call to public telephone number NUM2, or to reject it. The tariff rate of the call will be established by tariff rate attributes TAT.

Storage device MEM contains data regarding the allocation of public telephone numbers to private telephone numbers. The public telephone number through which it can be reached is allocated to each telephone number from the private numbering plan. Thus, e.g. public telephone number PU2 is allocated to private telephone numbers PR4, PR5 and PR6, and public telephone number PU4 is allocated to private telephone number PR10.

The classification device CLAS checks whether a call originates from one of the communication units COM2 to COM4 in the virtual private network VPNET. It receives data from the communication unit COM regarding public telephone number NUM3, and checks whether this telephone number is allocated to a private telephone number as a public telephone number stored in the data set of storage device MEM. If this is so, then telephone number NUM3 is the public telephone number of a communication unit of the virtual private network VPNET. After the check, it informs the tariff rate device TAR, the grouping device GROUP and addressing device SPACE, whether or not telephone number NUM3 belongs to a communication unit in the virtual private network VPNET.

It is also possible to answer in a different way the question whether a call originates from a communication unit in the virtual private network VPNET. For example, each of the communication units in the virtual private network VPNET could contain a number sequence in the dialing information, in addition to the service identification and the private telephone number, which would act as an identification code. In that event it would be the task of classification device CLAS to identify this code and transmit the results.

The tariff rate device TAR determines the tariff rate attributes TAT of a call. To that end it receives data from the classification device CLAS regarding whether or not the call originates from the virtual private network VPNET. It determines different tariff rates TAT for each of these two instances and transmits them to communication unit COM.

The tariff ram attributes TAT determine which subscriber pays for a connection and on which tariff rate the connection is based. A tariff rate is a price list for connections allocated to a group of subscribers to the public telephone network. All connections made by the subscribers of the virtual private network VPNET are charged to the operator of the virtual private network VPNET. This big customer receives very special tariff rates. All the connections taking place on the basis of calls from outside the virtual private network VPNET are charged to the calling subscriber, based on a normal tariff rate.

Other types, or a different allocation of tariff rate attributes, is possible. It is especially possible that connections, which take place on the basis of calls from outside the virtual private network VPNET, are fully or partially paid by the operator of the virtual private network VPNET. In that case, it is also possible for the distribution of the fees to be a function of the telephone number NUM3 of the calling subscriber.

In response to the private telephone number NUM1, the translation device TRANS transmits to communication device COM the public telephone number NUM2, or informs it that the called number does not exist. To that end it searches the data set in storage device MEM. If found, it transmits the telephone number to the communication device COM. Otherwise it informs it that no telephone number exists. The grouping device GROUP and the addressing device SPACE can participate in this search.

The grouping device GROUP is responsible for the formation of a closed user group. This intends to achieve that some terminals of the virtual private network VPNET can only be reached from terminals also belonging to the virtual private network VPNET. To that effect, the grouping device GROUP receives data from the classification device CLAS regarding whether or not the call originates from the virtual private network VPNET. It receives data regarding the private telephone number NUM1 from the communication device COM. Now, grouping device GROUP checks whether telephone number NUM1 is a member of the closed user group. If this is so, and the call does not originate from the virtual private network VPNET, translation device TRANS is informed that no search and no telephone number allocation is to take place.

It is also possible to configure the grouping device GROUP in such a way, that several closed user groups of any composition are possible. The grouping device GROUP would then have to receive additional data regarding telephone number NUM3. It would then be possible to form a user group from any desired combination of terminals of the virtual private network VPNET, in which all terminals not belonging to the virtual private network VPNET are included or excluded.

With the addressing device SPACE, different address spaces could be formed for calls from the virtual private network VPNET and from the outside. This means that two different terminals can be reached with one telephone number, depending on whether or not a call originates from the virtual private network VPNET. Such a telephone number allocation is useful e.g. for a central.

To that effect, addressing device SPACE receives data from the classification device CLAS regarding whether or not a call originates from the virtual private network VPNET. From the communication device COM it receives data regarding telephone number NUM1. The addressing device now checks whether telephone number NUM1 is a number with which two different terminals can be reached. If this is the ease, and the call originates from the outside, translation device TRANS is told not to perform a search. Subsequently it is informed of the corresponding telephone number NUM2.

It is further possible to allocate different address spaces to calls originating from outside the virtual private network VPNET, depending on their area of origin. Thus, calls e.g. from outside the nearest service division of a company could be switched. To that end, the addressing device SPACE would have to receive additional data regarding telephone number NUM3 from the communication device COM.

It is also possible to omit the grouping device GROUP or the addressing device SPACE.

The example in FIG. 1 explains the application of the method according to the invention in a communication arrangement consisting of a virtual private network and a public network. It is also possible for any number of virtual private networks to be part of the communication arrangement. Each of these virtual private networks would have its own service computer with its own service identification. This service identification would then address the service computers of exchanges SSP1 and SSP2. It is then also possible for one computer to take over the functions of several service computers.

What is claimed is:

1. A call-routing method for a virtual private network (VPNET) consisting of two or more communication units (COM2 to COM4) which are interconnected via switched connections of a public network (PUBNET), wherein to make the switched connections associated with a call, a service is dialled which then initiates further switching based on a private numbering plan, characterized in that to establish a connection to a subscriber (A,B) of the virtual private network (VPNET), a subscriber (C) of the public network (PUBNET) dials said service which then initiates further switching to one of the communication units (COM2 to COM4), that the service assigns tariffing rate attributes (TAT) to each call serviced by it, and that the service assigns to a call between the communication units (COM2 to COM4) forming the virtual private network, different tariffing rate attributes (TAT) than it does for other calls serviced by it.

2. A method as claimed in claim 1, characterized in that at least some of the communication units (COM2 to COM3) associated with the virtual private network (VPNET) as well as other communication units (COM1) are private branch exchanges (PBX1 to PBX3) provided with two or more terminals (E1, E2, E3; E4, E5, E6; E7, E8, E9).

3. A method as claimed in claim 2, characterized in that a tariff group is a tariff rate attribute associated with a preselected group of terminals, and that via the tariffing rate attributes (TAT), it is determined which tariff group applies to a call.

4. A method as claimed in claim 1, characterized in that at least some of the communication units (COM4 to COM6) are single terminals (E10 to E12).

5. A method as claimed in claim 1, characterized in that via the tariffing rate attributes (TAT) it is determined which subscriber (A, B, C) pays for a call.

6. A method as claimed in claim 5, wherein an operator is associated with a virtual private network (VPNET), and that charges are associated with the making of calls, and characterized in that all calls within the virtual private network (VPNET) are paid for by the operator of said network, and that for all other calls, the charges are billed to the subscriber (C) making the call.

7. A method as claimed in claim 6, wherein a telephone number (PU3, PU2, PU6; NUM3) is transmitted with a call, and characterized in that the service determines that the call is made by the virtual private network (VPNET) by determining the telephone number (PU3, PU2, PU6; NUM3) of the calling subscriber (A, B, C).

8. A method as claimed in claim 6, wherein an identifying code is transmitted with a call, and characterized in that the service determines that the call is made by the virtual private network (VPNET) by the identifying code transmitted with said call.

9. A service computer (SERV) for connection to a network, comprising an interface for communication with at least one switching facility (SSP1, SSP2), a memory device (MEM) designed to store data on a private numbering plan which assigns public telephone numbers (PU2 to PU4) to private telephone numbers (PR4 to PR10), a translator (TRANS) for translating private telephone numbers (PR4 to PR10) into public telephone numbers (PU2 to PU4), and a classification device (CLAS) for checking the association of a telephone number (NUM3) with the public telephone numbers (PU2 to PU4) stored in the memory device (MEM), characterized in that the service computer (SERV) includes a tariff rate device (TAR) for generating tariffing rate attributes (TAT), and that the classification device (CLAS) is designed to send to the tariff rate device (TAR) data on the association of a telephone number (NUM3) with the public telephone numbers (PU2 to PU4) stored in the memory device (MEM).

10. An exchange comprising at least one service computer (SERV) which is provided with a memory device (MEM) designed to store data on a private numbering plan which assigns public telephone numbers (PU2 to PU4) to private telephone numbers (PR4 to PR10), a translator (TRANS) for translating private telephone numbers (PR4 to PR10) into public telephone numbers (PU2 to PU4), and a classification device (CLAS) for checking the association of a telephone number (NUM3) with the public telephone numbers (PU2 to PU4) stored in the memory device (MEM), characterized in that the server (SERV) includes a tariff rate device (TAR) for generating tariff rate attributes (TAT), and that the classification device (CLAS) is designed to send to the tariff rate device (TAR) data on the association of a telephone number (NUM3) with the public telephone numbers (PU2 to PU4) stored in the memory device (MEM).

* * * * *